(12) United States Patent
Harrison et al.

(10) Patent No.: US 8,137,818 B2
(45) Date of Patent: Mar. 20, 2012

(54) POLY(LACTIC ACID)-CONTAINING COMPOSITIONS FOR USE IN IMPARTING OIL, GREASE, OR WATER RESISTANCE TO PAPER

(75) Inventors: Michael D. Harrison, Decatur, IL (US); Geoffrey A. R. Nobes, Decatur, IL (US); Penelope A. Patton, Decatur, IL (US); Shiji Shen, Forsyth, IL (US); Henk Westerhof, Tijnje (NL)

(73) Assignee: Tate & Lyle Ingredients Americas LLC, Decatur, IL (US)

( * ) Notice: Subject to any disclaimer, the term of this patent is extended or adjusted under 35 U.S.C. 154(b) by 36 days.

(21) Appl. No.: 12/506,369

(22) Filed: Jul. 21, 2009

(65) Prior Publication Data

US 2010/0021751 A1 Jan. 28, 2010

Related U.S. Application Data

(60) Provisional application No. 61/084,010, filed on Jul. 28, 2008.

(51) Int. Cl.
*B32B 27/06* (2006.01)
(52) U.S. Cl. ............... 428/532; 428/537.5; 525/186; 525/190
(58) Field of Classification Search ............ 428/532, 428/537.5; 525/186, 190
See application file for complete search history.

(56) References Cited

U.S. PATENT DOCUMENTS

| | | | | |
|---|---|---|---|---|
| 2,304,287 | A | 12/1942 | Schur et al. | 117/83 |
| 3,706,590 | A | 12/1972 | Moyer et al. | 117/111 B |
| 3,767,439 | A | 10/1973 | Moyer et al. | 106/210 |
| 3,770,685 | A | 11/1973 | Uffner et al. | 260/29.4 UA |
| 6,291,075 | B1 | 9/2001 | Zhang et al. | 428/452 |
| 6,790,270 | B1 | 9/2004 | Billmers et al. | 106/145.1 |
| 2002/0164440 | A1 | 11/2002 | Leeper et al. | 428/34.3 |
| 2004/0241475 | A1 | 12/2004 | Morabito | 428/507 |
| 2005/0008736 | A1 | 1/2005 | Egan et al. | 426/107 |
| 2008/0050603 | A1* | 2/2008 | Randall et al. | 428/480 |

FOREIGN PATENT DOCUMENTS

| | | |
|---|---|---|
| EP | 0 286 222 | 10/1988 |
| GB | 1009486 | 11/1965 |
| GB | 1 359 389 | 7/1974 |
| JP | 10101911 | 4/1998 |
| JP | 303478 | 10/2001 |
| JP | 121288 | 4/2002 |
| JP | 356612 | 12/2002 |
| JP | 096281 | 4/2003 |
| JP | 119693 | 4/2003 |
| JP | 321600 | 11/2003 |
| JP | 099883 | 4/2004 |
| JP | 131859 | 4/2004 |
| JP | 277679 | 10/2004 |
| JP | 277681 | 10/2004 |
| JP | 323804 | 11/2004 |
| JP | 290156 | 10/2005 |
| JP | 336640 | 12/2005 |
| JP | 097141 | 4/2006 |
| JP | 104227 | 4/2006 |
| JP | 104622 | 4/2006 |
| JP | 124439 | 5/2006 |
| JP | 223942 | 8/2006 |
| WO | WO94/26513 | 11/1994 |
| WO | WO00/01530 | 1/2000 |
| WO | WO/0001530 | * 1/2000 |
| WO | WO00/77300 | 12/2000 |
| WO | WO01/92401 | 12/2001 |
| WO | WO02/14426 | 2/2002 |
| WO | WO03/064167 | 8/2003 |
| WO | WO2005/019363 | 3/2005 |
| WO | WO/2005/054333 | * 6/2005 |

OTHER PUBLICATIONS

Gottschalk et al., *Macromolecules* 39:1719-1723 (2006).
Kwak et al., *Chem. Mater.* 17:1148-1156 (2005).
Lehermeier et al., *Polymer Engineering and Science* 41(12):2172-2184 (Dec. 2001).

* cited by examiner

*Primary Examiner* — Leszek Kiliman
(74) *Attorney, Agent, or Firm* — Williams, Morgan & Amerson, P.C.

(57) ABSTRACT

Herein disclosed is a composition containing from about 5 weight parts to about 50 weight parts of a branched polylactic acid; from about 50 weight parts to about 95 weight parts of water; and from about 0.1 weight parts to about 1 weight part of a first surfactant. The composition can be coated onto a substrate containing paper or paperboard and having a first surface and a second surface, to form a paper product having oil, grease, and moisture resistance.

21 Claims, 1 Drawing Sheet

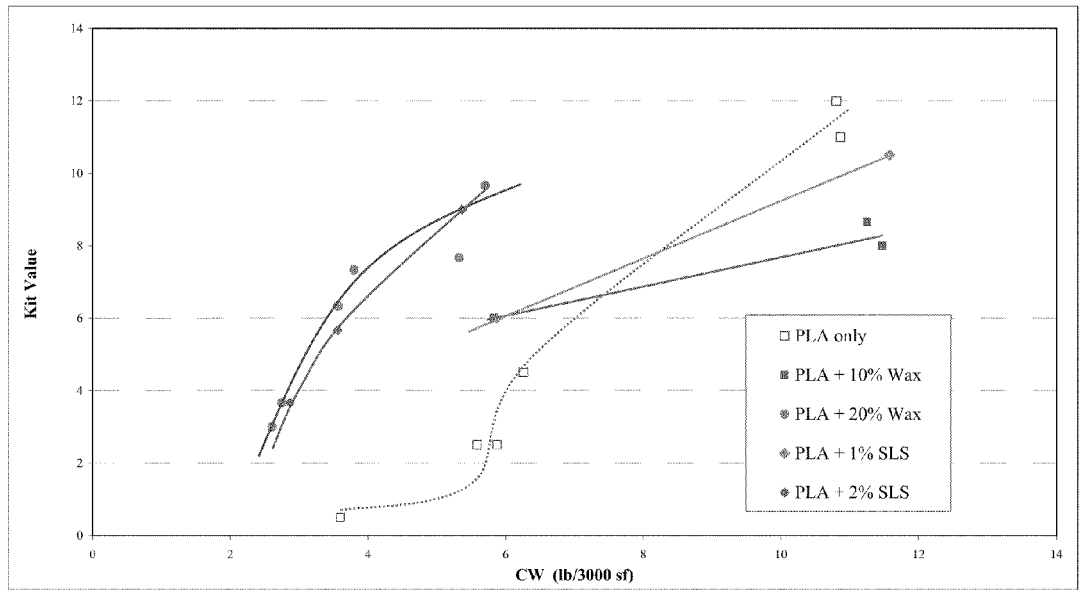
Figure 1. Dependence of OGR performance on coat weight with 35% emulsion.
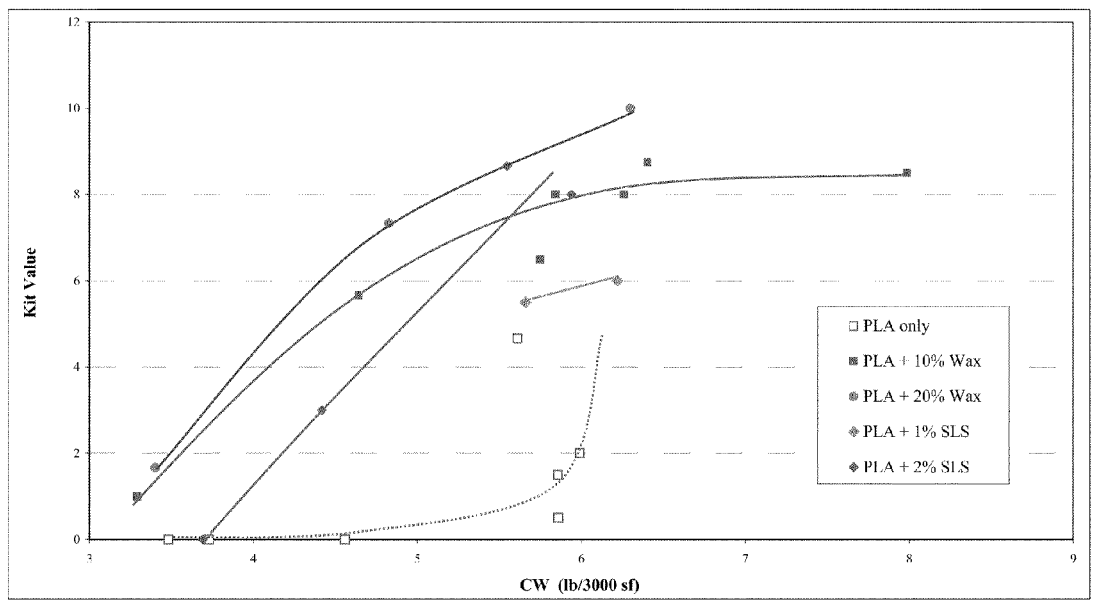
Figure 2. Dependence of OGR performance on coat weight with 20% emulsion.

POLY(LACTIC ACID)-CONTAINING COMPOSITIONS FOR USE IN IMPARTING OIL, GREASE, OR WATER RESISTANCE TO PAPER

This application claims priority from U.S. provisional patent application Ser. No. 61/084,010, filed on Jul. 28, 2008, which is incorporated herein by reference.

BACKGROUND OF THE INVENTION

The present invention relates generally to the fields of polylactic acid compositions. More particularly, it concerns polylactic acid compositions that impart oil, grease, or water resistance when coated on paper products.

Fluorochemicals have been used to impart oil or grease resistance to paper or paperboard used to package oily or greasy foods, such as pet foods, microwaveable popcorn, pizza, fried potatoes, fried vegetables, pastries, chocolate bars, or foods containing oil-based sauces. However, there exist various anxieties regarding possible negative impacts of fluorochemicals on human health or the environment, and at least one major supplier of fluorochemicals exited the market for those reasons.

There exists a need for alternative materials to impart oil or grease resistance to paper or paperboard. It would be especially desirable if such an alternative material could be processed with apparatus already known in the art of paper coatings. It would also be desirable if such an alternative material also imparted water resistance to paper or paperboard.

SUMMARY OF THE INVENTION

In one embodiment, the present invention relates to a composition containing from about 5 weight parts to about 50 weight parts of a branched polylactic acid; from about 50 weight parts to about 95 weight parts of water; and from about 0.1 weight parts to about 1 weight part of a first surfactant.

In another embodiment, the present invention relates to a paper product containing a substrate containing paper or paperboard and having a first surface and a second surface, and a coating applied at least to part of the first surface of the substrate, wherein the coating contains from about 5 weight parts to about 50 weight parts of a branched polylactic acid and from about 0.1 weight parts to about 1 weight part of a first surfactant.

BRIEF DESCRIPTION OF THE DRAWINGS

The invention may be understood by reference to the following description taken in conjunction with the accompanying drawings.

FIG. 1 plots the OGR performance of the compositions shown in table form at Table 4.

FIG. 2 plots the OGR performance of the compositions shown in table form at Table 5.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF ILLUSTRATIVE EMBODIMENTS

In one embodiment, the present invention relates to a composition containing from about 5 weight parts to about 50 weight parts of a branched polylactic acid; from about 50 weight parts to about 95 weight parts of water; and from about 0.1 weight parts to about 1 weight part of a first surfactant.

In a further embodiment, the composition contains from about 15 weight parts to about 35 weight parts of the branched polylactic acid; from about 65 weight parts to about 85 weight parts of water; and from about 0.2 weight parts to about 0.6 weight parts of the surfactant.

The branched polylactic acid is a polymer containing a majority of polylactic acid units and a plurality of branched moieties. In one embodiment, the branched polylactic acid has a degree of branching from about 4% to about 20%. The degree of branching (DB) can be calculated as $DB=2(1-x_{polylactic\ acid})/(2-x_{polylactic\ acid})^2$, where $x_{polylactic\ acid}$ is the mole fraction of polylactic acid units in the branched polylactic acid. The mole fraction of polylactic acid units in the branched polylactic acid can be determined by NMR or rheology, among other techniques known in the art and discussed by Gottschalk, et al., *Macromolecules* 2006, 39, 1719-1723; Lehermeier, et al., *Polym. Engr. Sci.*, December 2001, 41(12), 2172-2184; and Kwak, et al., *Chem. Mater.* 2005, 17, 1148-1156, the disclosures of which are hereby incorporated by reference.

In a particular embodiment, the branched polylactic acid comprises from about 3.3 weight parts to about 33 weight parts lactic acid residues; from about 1.3 weight parts to about 13 weight parts polyol residues, wherein the polyol has a molecular weight from about 1000 Da to about 20,000 Da and an OH value from about 10 mg KOH/g to about 100 mg KOH/g; and from about 0.4 weight parts to about 4 weight parts anhydride residues. As will be apparent to the person of ordinary skill in the art, the parameters of the polyol stated above refer to the polyol prior to polymerization of the branched polylactic acid, as many hydroxyl or carboxylic acid groups of the polyol will react with hydroxyl or carboxylic acid groups of the lactic acid, the anhydride, or both to form the branched polylactic acid.

The branched polylactic acid can be prepared by any process known in the art. In one embodiment, the branched polylactic acid is produced by a process including the following steps. (1) Heating the lactic acid, from about 0.0033 weight parts to about 0.033 weight parts of a catalyst selected from the group consisting of stannous alkanoates, tin(II) halides, and mixtures thereof, and from about 0.08 to about 1 weight part of a poly(alkylol)alkane to a temperature from about 170° C. to about 210° C., to yield a first reaction mixture comprising water; removing water from the first reaction mixture. (2) Lowering the first reaction mixture to a pressure of less than about 50 mm Hg over from about 1 hr to about 10 hr. (3) Maintaining the first reaction mixture at temperature from about 170° C. to about 210° C. and a pressure of less than about 50 mm Hg for a duration from about 2 hr to about 20 hr. (4) Raising the first reaction mixture to about atmospheric pressure. (5) Adding the polyol and from about 0.005 weight parts to about 0.1 weight parts phosphoric acid to the first reaction mixture, to yield a second reaction mixture. (6) Heating the second reaction mixture to a temperature from about 170° C. to about 210° C., to yield a third reaction mixture comprising water. (7) Removing water from the third reaction mixture. (8) Lowering the third reaction mixture to a pressure of less than about 25 mm Hg over from about 0.5 hr to about 5 hr. (9) Maintaining the third reaction mixture at temperature from about 170° C. to about 210° C. and a pressure of less than about 25 mm Hg for a duration from about 1.5 hr to about 12 hr. (10) Raising the third reaction mixture to about atmospheric pressure. (11) Adding the anhydride to the third reaction mixture, to yield a fourth reaction mixture. (12) Heating the fourth reaction mixture to a temperature from about 170° C. to about 210° C., to yield a fifth reaction mixture comprising water. (13) Removing water from the fifth reaction mixture. (14) Lowering the fifth reaction mixture to a pressure of less than about 35 mm Hg over from about 0.5 hr to about 5 hr. (15) Maintaining the third reaction mixture at temperature from about 170° C. to about 210° C. and a pressure of less than about 35 mm Hg for a duration from about 1 hr to about 10 hr.

In various embodiments, poly(alkylol)alkanes hereof, i.e. poly(hydroxyalkyl)-alkanes useful herein, can have from about 5 to about 12 carbon atoms and at least three unsubstituted hydroxyl groups. In some embodiments, the alkylol groups thereof can be methylol (i.e. hydroxymethyl) or ethylol (i.e. hydroxyethyl) groups. In various embodiments, the poly(alkylol)alkane can be a polyhydroxy, branched C5-C6 alkane or a bis adduct thereof. Trimethylol- and/or triethylol-substituted C1-C6 alkanes can be used, such as those in which the methylol and/or ethylol substituents are located on a common, terminal carbon atom of the alkane. Examples of useful poly(alkylol)alkanes include trimethylolpropane, trimethylolethane, pentaerythritol, triethylolethane, and triethylol propane; examples of useful bis adduct versions thereof include ditrimethylolpropane and dipentaerythritol.

Stannous alkanoates useful herein can comprise from 2 to 20 carbon atoms; an illustrative example is stannous octoate.

The first surfactant can comprise any surfactant capable of facilitating a dispersion of the branched polylactic acid in water. In various embodiments, the surfactant is selected from the group consisting of nonionic surfactants, anionic surfactants, and combinations thereof; in some embodiments a combination can be used. In some embodiments, poly(C2-C3)alkoxylated-nonionic and/or -anionic surfactants can be particularly useful.

In various embodiments, the first surfactant can comprise a PEGylated and/or PPGylated surfactant, or a combination thereof, e.g., as a combination of nonionic and anionic types of such surfactants, wherein "PEGylated" and "PPGylated" refer to the presence of at least one ethylene or propylene glycol residue in the compound. In some embodiments, the first surfactant can comprise a PEGylated surfactant, or a combination thereof, e.g., a combination of PEGylated nonionic and PEGylated anionic surfactants. In such PEGylated and/or PPGylated surfactants, at least one PEG and/or PPG chain is attached by ether linkage to an aliphatic group, typically of a straight or branched chain architecture, such as from a fatty alcohol or polyol or an alkyne diol or polyol; wherein the aliphatic group is a C8-C22 aliphatic group, and the average number of alkyl glycol residues, present among all the PEG and/or PPG chain(s) of the compound, can typically be from 2 to about 60.

In various embodiments, the first surfactant can comprise a non-ionic surfactant that is or comprises one or more of the polyalkoxylated alkyne diols, wherein the alkoxy groups are obtainable as residues of ethylene oxide and/or propylene oxide, typically ethylene oxide, and the alkyne diol contains from 8 to about 22 carbon atoms. These can be referred to as alkyne diol ether surfactants. In various embodiments, the polyalkoxylated alkyne diols will contain an average of at least or about 5 moles alkylene oxide residues per mole of alkyne diol, and in some embodiments up to 50 or 60 moles alkylene oxide residues, wherein each of the two hydroxyl groups of the alkyne diol is independently attached to at least one alkylene oxide residue, typically to a chain of at least 2, and preferably of at least or about 5 residues; in some embodiments, each of the two hydroxyl groups can be attached to polyalkoxy chains of approximately the same number of residues. In some embodiments, the average moles of alkoxy groups per mole of alkyne diol can be at least or about 10, 15 or 20, or up to or about 10, 20, 30, 40, or 50. "About 10" in this context refers to a typical range of 7-13 moles alkoxy groups on average per mole of alkyne diol. Exemplary polyalkoxylated alkyne diol surfactants can be prepared as adducts of polyoxyalkylene glycol chains and the selected diol(s), or as reaction products of ethylene oxide (oxirane) and/or propylene oxide (methyl oxirane) with the selected diol(s), according to any of various methods known in the art.

In nonionic surfactants for use herein, where an alkyne diol thereof is relatively longer, it can and typically does employ longer polyalkoxy chains, and where the alkyne diol is relatively shorter, it can contain shorter polyalkoxy chains. In general, where the alkyne diol contains 8 or is based on a chain of 8 carbon atoms, the resulting alkyne diol ether comprises from 2 to about 15 or 20 alkoxy groups, and can typically contain about 10 alkoxy groups; and where the alkyne diol contains 22 or is based on a chain of 22 carbon atoms, the resulting alkyne diol ether can comprise from 2 to about 50 or 60 alkoxy groups, and can typically contain from about 20 to about 30 or 40 alkoxy groups. Also, where the alkyne diol contains or is based on a chain of an intermediate number of carbon atoms, e.g., about 10-18 carbon atoms, the resulting alkyne diol ether can comprise an intermediate range of alkoxy groups, e.g., from 2 to about 30 alkoxy groups, and can typically contain from about 15 to about 30 alkoxy groups.

In some embodiments, the alkyne diol(s) can have its two hydroxyl groups located each on a different carbon atom and vicinal to the alkyne group. In some embodiments, the alkyne diol(s) can have the alkyne triple bond located as the central carbon-carbon bond of the main chain of the alkyne skeleton. In some embodiments, an alkyne diol(s) can be selected that has C1-C4 aliphatic (or cycloaliphatic) substituents on the main chain, each substituted position thereon being independently substituted.

Thus, exemplary nonionic surfactants include ethoxylated and/or propoxylated versions of C1-C4 substituted or unsubstituted forms of any of the following alkyne diols: 3-hexyne-2,5-diol; 4-octyne-3,6-diol; 5-decyne-4,7-diol; 6-dodecyne-5,8-diol; 7-tetradecyne-6,9-diol; 8-hexadecyne-7,10-diol; 9-octadecyne-8,11-diol; 10-eicosyne-9,12-diol; or 11-docosyne-10,13-diol; in some embodiments, substituted or unsubstituted forms of any of the following can be particularly useful: 5-decyne-4,7-diol; 6-dodecyne-5,8-diol; or 7-tetradecyne-6,9-diol. In some embodiments in which the nonionic surfactant is based upon a dodecyne diol or shorter alkyne diol, the alkyne chain will be alkyl substituted; in embodiments in which the nonionic surfactant is based upon a tetradecyne diol or longer alkyne diol, the alkyne chain can be alkyl substituted or unsubstituted. Thus, exemplary alkyne diols include: 2,5-substituted-3-hexyne-2,5-diols; 3,6-substituted- or 2,3,6,7-substituted-4-octyne-3,6-diols; 4,7-substituted- or 2,4,7,9-substituted-5-decyne-4,7-diols; 5,8-substituted- or 2,5,8,11-substituted-6-dodecyne-5,8-diols; 6,9-substituted- or unsubstituted-7-tetradecyne-6,9-diols; 7,10-substituted- or unsubstituted-8-hexadecyne-7,10-diols; 8,11-substituted- or 5,8,11,14-substituted- or unsubstituted-9-octadecyne-8,11-diols; and 10,13-substituted- or unsubstituted-11-docosyne-10,13-diols; in which the substitutions are independently as hereinbefore described.

In some embodiments, specific examples of useful alkyne diol unit(s) can be selected from among: 3,6-dimethyl-4-octyne-3,6-diol; 2,3,6,7-tetramethyl-4-octyne-3,6-diol; 3,6-diethyl-4-octyne-3,6-diol; 4,7-dimethyl-5-decyne-4,7-diol; 2,4,7,9-tetramethyl-5-decyne-4,7-diol; 4,7-dipropyl-5-decyne-4,7-diol; 5,8-dimethyl-6-dodecyne-5,8-diol; 2,5,8,11-tetramethyl-6-dodecyne-5,8-diol; 7-tetradecyne-6,9-diol; 6,9-dimethyl-7-tetradecyne-6,9-diol; 5,10-diethyl-7-tetradecyne-6,9-diol; 8-hexadecyne-7,10-diol; 7,10-dimethyl-8-hexadecyne-7,10-diol; 9-octadecyne-8,1-diol; and 8,11-dimethyl-9-octadecyne-8,11-diol; and combinations thereof.

In some embodiments, the main chain of the alkyne diol(s) can comprise 6-22 carbon atoms, or from 10-18 carbon atoms. In some embodiments, the alkyne diol(s) can contain a total of 10-18, 12-16, 12-14, or 14 carbon atoms. In some embodiments, the alkyne diol unit(s) can be selected from among 2,3,6,7-tetramethyl-4-octyne-3,6-diol; 2,4,7,9-tetramethyl-5-decyne-4,7-diol; and 2,5,8,11-tetramethyl-6-dodecyne-5,8-diol; and combinations thereof; and in some embodiments, these can be selected from among 2,3,6,7-tetramethyl-4-octyne-3,6-diol; and 2,4,7,9-tetramethyl-5-decyne-4,7-diol; and combinations thereof.

In some embodiments, the alkyne diol unit(s) can be or can include 2,4,7,9-tetramethyl-5-decyne-4,7-diol. An a exemplary surfactant of this type, having an average of 10 moles ethylene oxide units per alkyne diol unit is available as Surfynol® 465 (Air Products and Chemicals, Inc.; Allentown, Pa., USA).

In various embodiments, an anionic surfactant for use in or as the first surfactant can be selected from among the alkyl ether sulfate surfactants in which the alkyl groups are C8-C22 alkyl, and combinations thereof. These can be referred to as alketh sulfate surfactants or alkanol ether sulfate surfactants. A particular useful class of these surfactants is the polyalkoxy alkyl ether sulfates in which the alkoxy groups are obtainable as residues of ethylene oxide and/or propylene oxide, typically ethylene oxide. In some embodiments, the alkoxy groups can be present in a mole ratio of about 1:1 to about 30:1 per alkyl group.

In anionic surfactants for use herein, where an alkyl chain thereof is relatively longer, it can and typically does employ a longer polyalkoxy chain, and where the alkyl chain is relatively shorter, it will contain a shorter polyalkoxy chain. In some embodiments, the same ranges described above for the total alkoxy group content of an alkyne diol surfactant molecule can be used in a given molecule of an anionic alkyl sulfate surfactant hereof. In some embodiments, a different set of ranges can be employed as follows: in general, where the alkyl chain contains 8 carbon atoms, the resulting anionic surfactant comprises from 1 to about 10 alkoxy groups; and where the alkyl chain contains 22 carbon atoms, the resulting alkyne diol ether can comprise from 1 to about 30 alkoxy groups, and typically from about 20 to about 30 alkoxy groups. Also, where the alkyl chain contains an intermediate number of carbon atoms, e.g., about 18 carbon atoms, the resulting anionic surfactant can comprise an intermediate range of alkoxy groups, e.g., from 1 to about 20 alkoxy groups, and typically from about 10 to about 20 alkoxy groups.

In some embodiments, the counter-cation present in the anionic surfactant can be an ammonium cation, or an alkali metal or alkaline earth metal cation. In some embodiments, the ammonium cation can be a C1-C2 mono- or poly-alkyl ammonium cation, e.g., methyl-ammonium. In some embodiments, the alkali metal can be lithium, sodium, or potassium; in some embodiments, the alkaline earth metal can be magnesium. Combinations of cations can be present in some embodiments. Sodium can be typically used.

In some embodiments, the alkyl groups of the anionic surfactant can be or can comprise C12 and/or C14 alkyl groups. Such alkyl groups can be provided by C12 or C14 alcohols, or a combination thereof, or by a mixture of alcohols containing about or at least 50% by weight of C12 and/or C14 alcohols, such as coconut acyl alcohols or palm kernel acyl alcohols. Exemplary alketh sulfate surfactants of this type are the sodium C12-C14 alketh-30 sulfate and sodium coceth-30 sulfate surfactants available as Disponil® FES 77 and Disponil® FES 77 IS (Cognis Corp.; Cincinnati, Ohio, USA).

In a further embodiment, the surfactant is selected from the group consisting of Surfynol® 465, a Disponil® FES 77 surfactant, and mixtures thereof.

The composition can also contain other materials. In one embodiment, the composition further contains from about 0.1 weight parts to about 1 weight part of ammonia. In another embodiment, the composition contains a material selected from the group consisting of press starches, pigments, and mixtures thereof. A press starch may increase the viscosity of the composition. A pigment may impart a color to the composition. The composition can contain one or more water soluble gums, such as carrageenan, locust bean gum, xanthan, gellan, agar, alginate, guar, gum arabic, or pectin. The composition can contain organic or inorganic filler or pigment particles, such as clay, calcium carbonate, titanium dioxide, or synthetic organic pigments.

In one embodiment, the composition further comprises an additive selected from the group consisting of from about 5 weight parts to about 40 weight parts wax, from about 0.5 weight parts to about 5 weight parts of a second surfactant, and mixtures thereof.

The wax can be any wax which can be emulsified in the composition. In one embodiment, the wax is paraffin wax. In one embodiment, the composition comprises from about 10 weight parts to about 20 weight parts of the wax.

The second surfactant can be any surfactant, for example, those referred to above, or another surfactant known to be usable in compositions containing polylactic acid. In one embodiment, the second surfactant is sodium lauryl sulfate (SLS). In one embodiment, the composition comprises from about 1 weight part to about 2 weight parts of the second surfactant.

The viscosity of the composition may be relatively low. In one embodiment, the composition has a viscosity, as measured on a Brookfield viscometer with a #3 spindle at 100 rpm and 140° F., from about 0.1 cps to about 20 cps. In another embodiment, the composition has a viscosity, as measured on a Brookfield viscometer with a #3 spindle at 100 rpm and 75° F., from about 10 cps to about 100 cps.

In one embodiment, the present invention relates to a paper product containing a substrate containing paper or paperboard and having a first surface and a second surface, and a coating applied at least to part of the first surface of the substrate, wherein the coating contains from about 5 weight parts to about 50 weight parts of a branched polylactic acid and from about 0.1 weight parts to about 1 weight part of a first surfactant.

The oil-grease resistance (OGR) of a paper is imparted by a polymer coating, a film, on its surface. Its performance is highly dependent on the integrity and surface character of the film. Incorporating special additives in the formulation would change the film structure and surface composition and thus, improve OGR performance.

During the drying stage of a polymer emulsion, drying (on the surface) and penetration (into the interior of paper) happens simultaneously. An ideal case is no penetration since it increases the surface area to cover, leading to a thinner film with possibly more defects. However, for an emulsion with low viscosity, which is required by Size Press, the penetration can only be delayed.

A structural agent (structurant) is able to link the polymer chains/particles together and reduce their mobility and thus, slow down the penetration. Moreover, if the structurant is a surface active agent, such as sodium lauryl sulfate (SLS), it would change the surface character, especially the hydrophobicity. Also, if the structurant is a particulate, such as wax emulsion (wax particle with surfactant adsorbed on its surface), the particulate-polymer chain/particle associates has surely more difficult to move than polymer chain/particle.

Therefore, an effective structurant should be able to interact with polymer chain/particle and form polymer-structurant association, leading to three possible benefits: (1) improving the interaction of polymer chain/particle and thus, the integrity of the film, (2) slowing down penetration, and (3) modifying surface character of the film.

Paper and paperboard are known materials. Typical paper known for use in food packaging has weights from about 15 lbs per 3000 square feet to about 190 lbs/3000 square feet, and typical paperboard has a caliper of 0.012 inches or greater. The coating can be as described above. The coating can be applied at least to part of the first surface of the substrate by any known technique. Exemplary techniques include, but are not limited to, use of a puddle size press, a flooded nip size press, a rod coater, and a blade coater, a tub, a gate roll, a spray applicator, or a calendar stack sizer, among others. In one embodiment, the technique is use of a puddle size press or a flooded nip size press. The coating can also be applied to part of or part of second surface of the substrate, if so desired.

The paper product can be produced by a process including applying, with an apparatus selected from the group consisting of a puddle size press, a flooded nip size press, a rod coater, and a blade coater, and at a temperature from about 50° F. to about 180° F., a composition comprising from about 5 weight parts to about 50 weight parts of a branched polylactic acid, from about 50 weight parts to about 95 weight parts of water, and from about 0.1 weight parts to about 1 weight part of a first surfactant to the substrate.

In one embodiment, the paper product can be in the form of a package that contains an oily or greasy food, wherein the coating stands between the oily or greasy food and the substrate. Such an arrangement may allow the paper product to resist penetration by oil or grease packaged therein. In one embodiment, the oily or greasy food is selected from the group consisting of pet food, microwaveable popcorn, pizza, fried potatoes, fried vegetables, pastries, chocolate bars, and foods containing an oil-based sauce (for example, a sauce based on cream, vegetable oil, butter, or lard, among other materials).

In one embodiment, the paper product contains from about 0.1 lb to about 15 lb polylactic acid per 25 lb of the substrate. In a further embodiment, the paper product contains from about 0.75 lb to about 8 lb polylactic acid per 25 lb of the substrate.

The paper product has oil and grease resistance. The oil and grease resistance can be quantified by one or more of a number of parameters. In one embodiment, the paper product has a parameter selected from the group consisting of an HST sizing value at least ten times greater than the HST sizing value of the substrate alone, a 3M Test Kit value greater than or equal to 4, and both.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

3M Test Kit Procedure (TAPPI Standard Test Method T559 cm-02)

Each sheet of paper to be tested was placed on a clean, flat surface, with care taken not to touch the area to be tested. On the test area was dropped, from a height of about 2.5 cm, a drop of test solution with a disposable pipette from an intermediate Kit Number bottle. A stopwatch was started as the drop was applied. After 15 seconds, excess fluid was removed with a clean absorbent paper towel and the wetted area was examined. Failure was evidenced by pronounced darkening of the specimen caused by penetration, even in a small area, under the drop. The procedure was repeated as required, making sure that drops from succeeding Kit Number bottles fell in untouched areas. Results were reported as the Kit Rating, which is the highest numbered solution (1-12) that stood on the surface of the specimen for 15 seconds without causing failure. Fractional values represent the average of multiple tests.

Dog Food Test Procedure

The dog food tests determine the ability of the sheet to resist the penetration of a high fat food item under accelerated storage conditions. They were performed as follows:

Cut papers in 10×10 centimeter squares. Folded test specimen in half diagonally. Rolled a 500 gram weight over the fold. Opened the folded sheet and placed on a tray. Measured about 40 ml of dog food (that contains no less than 20% crude fat) and placed on the test specimen which was positioned on the tray. Placed tray in a 190° F. oven for ten minutes (10 min dog food test) or a 140° F. oven for 16 hrs (16 hr dog food test). At the end of the required time, removed the tray from the oven and removed the dog food from the test specimen. Visually evaluated the paper for grease penetration on a scale from 0 to 10. A score of 0 indicated complete failure of the surface sizing to repel grease, i.e., the sheet was uniformly stained with grease. A score of 10 indicated no evidence of any grease being absorbed by the paper.

HST Sizing (TAPPI Standard Test Method T 530 oni-02)

Tested the time required for an aqueous green dye solution to penetrate a sheet. HST sizing gives a measure of resistance to penetration by water.

Viscosity

The viscosity of polylactic acid dispersions was measured using a Brookfield viscometer at 75° F. and 100 rpm with a #3 spindle.

Example 1

A polylactic acid (PLA) base resin was prepared from the components listed in Table 1.

TABLE 1

Materials List for PLA Resin

| Component: | Amount: (wt %) |
|---|---|
| Polymer grade L-lactic acid | 82.12 |
| Tin(II) chloride | 0.07 |
| Trimethylolpropane (TMP) | 2.15 |
| Phosphoric acid (85%) | 0.14 |
| CAPA 4801 | 30.04 |
| Pyromellitic di anhydride (PMDA) | 5.72 |
| Trimellitic anhydride (TMA) | 1.43 |
| Total | 121.67 |
| Water removed during reaction | 21.67 |
| Theoretical yield | 100 |

These components were combined according to the following method:

1. Charged the reactor with the lactic acid, tin(II)chloride and TMP.
2. Heated slowly to 190° C. while collecting water removed from reaction.
3. Decreased the pressure from 760 to 40 mmHg over 3 hours.
4. Continued the reaction at 190° C., 40 mmHg for 6 hours.
5. Added CAPA 4801 and phosphoric acid to the reactor.
6. Reheated to 190° C., then decreased pressure from 760 to 10 mmHg over 1.5 hours.
7. Continued reaction at 190° C., 10 mmHg for 4 hours.
8. Added PMDA and TMA to the reactor.
9. Reheated to 190° C., then decreased pressure from 760 to 20 mmHg over 1.5 hours.
10. Continued reaction at 190° C., 20 mmHg for 3 hours.
11. Collected product.

The base resin was then dispersed according to the following:

Two surfactants, Surfynol® 465 (0.12 wt %) and Disponil® FES 77 (0.30 wt %), along with ammonia (25% solution; 0.70 Wt %) were added to a beaker containing water (74 wt %) and heated to 65° C. The mixture was then mixed vigorously using a dispersing disc. 25 wt % of the base resin was added slowly to the mixture after first melting the resin. The agitation was continued until all the resin had been dispersed. The mixture was then cooled to room temperature while being stirred.

The viscosity of a 35% PLA dispersion was 54-58 cps and the viscosity of a 20% PLA dispersion was 29-34 cps, as measured according to the description above (e.g., at 75° F.). Typical size press starch pastes (used for applying fluorochemicals) have viscosity of about 50-150 cps at about 140° F.

Example 2

The PLA dispersion described above was applied to 25 lb/ream unsized base paper using a lab drawdown coater. Coating pick-up was controlled by varying the depth of the grooves of the drawdown rods. Sample coatings were tested and results are shown in Table 2.

TABLE 2

Performance Test Results for Sample PLA Coatings

| Coating pick-up, lb/ream | 10 min Dog food test | 16 hr Dog food test | Average HST (sec) | Average 3M Kit value |
|---|---|---|---|---|
| 0 (control) | 3 | 0 | 0.2 | 0 |
| 3.0 | 4 | 0 | 3 | 0 |
| 4.0 | 6 | 0 | 4 | 0 |
| 7.5 | 9 | 2 | 28 | 2 |
| 12.5 | 10 | 10 | 816 | 7 |

The results show that the PLA dispersion, when coated on paper at sufficient concentration, renders the paper grease resistant (as shown by the 3M Kit value and the dog food test values) and water resistant (as shown by the HST values relative to the control).

Example 3

Two classes of coating emulsions were prepared from a PLA emulsion, either alone or in combination with wax or sodium lauryl sulfate (SLS). The PLA emulsion composition is shown in Table 3.

TABLE 3

PLA Emulsion Composition

| Material | Active % | Composition wt % | g |
|---|---|---|---|
| PLA | 100 | 92.32 | 387.74 |
| Surfynol ® 465 | 100 | 0.48 | 2.02 |
| Disponil ® FES 77 | 33 | 0.4 | 5.09 |
| Sodium hydroxide | 50 | 6.8* | 57.12 |
| Water | 100 | | 748.03 |
| Total | | 100 | 1200.0 |
| Solid % | | 35.00 | |

*Enough to adjust composition to pH 5; HCl also used if needed

Selected additives were added to this emulsion and adjusted to 20% or 35% concentration by adding extra water. PLA emulsion was made in a reactor with water jacket at 70° C., while all those with additives were prepared at ambient temperature with an overhead stirrer.

The two classes of coating emulsions had solids contents of 20% or 35%, respectively. The materials used were HW26-147 polylactic acid (Hycail), SLS (Fisher), Surfynol® 465 (Air Products), Disponil® FES 77 (Cognis), sodium hydroxide (Fisher), and a paraffin wax emulsion. Deionized water was used.

The PLA was a "sticky rock" at ambient temperature, leading to a sticky film on paper coated with its emulsion. Incorporating SLS or wax emulsion into it resulted in non-sticky surface, as will be discussed below.

The coating emulsions were coated onto Boise 25 lb paper base with a K 303 multi-coater (RK Print Coat Instruments, Litlington, UK). Coated paper was hung to dry at 23° C. and 45% relative humidity. Viscosity of each emulsion was measured by Brookfield DV-E Viscometer at ambient temperature. Dry and conditioned paper was tested by 3M Kit (TAPPI T-559 standard test for Grease Resistance for Paper and Paperboard, established by the Technical Association of the Pulp and Paper Industry, Norcross, Ga., USA; and available from 3M Company, St. Paul, Minn., USA) and scored from 0 to 12 (worst to best) based on the liquid wetting and penetrating.

The Kit values of the coated papers prepared from the 35% emulsions are shown in Table 4 and FIG. 1. The Kit values of the coated papers prepared from the 20% emulsions are shown in Table 5 and FIG. 2.

TABLE 4

Effect of Additives at 35% Solution

| Formulation | | | Coat Weight (lb/3000 sf) | Coated Paper Property Kit Value |
|---|---|---|---|---|
| Composition | Solid % | Viscosity | Average | Average |
| PLA (HW26-147) | 35 | 68 | 10.9 | 11 |
| | | | 10.8 | 12 |
| | | | 6.3 | 4.5 |
| | | | 5.9 | 3 |
| | | | 5.6 | 2.5 |
| | | | 3.6 | 0.5 |
| PLA + 10% Wax | 35 | | 11.5 | 8 |
| | | | 11.3 | 9 |
| | | | 10.9 | |
| | | | 5.8 | 6 |
| PLA + 20% Wax | 35 | 54 | 5.7 | 9.7 |
| | | | 5.3 | 7.7 |
| | | | 3.8 | 7.3 |
| | | | 3.6 | 6.3 |
| | | | 2.8 | 3.7 |
| | | | 2.6 | 3 |
| PLA + 1% SLS | 35 | 54 | 11.6 | 10.5 |
| | | | 5.9 | 6 |
| | | | 11.3 | 8 |
| PLA + 2% SLS | 35 | 57 | 5.4 | 9.0 |
| | | | 3.6 | 5.7 |
| | | | 2.9 | 3.7 |

TABLE 5

Effect of Additives at 20% Solution

| Formulation | | | Coat Weight (lb/3000 sf) | Coated Paper Property Kit Value |
|---|---|---|---|---|
| Composition | Solid % | Viscosity | Average | Average |
| PLA (HW26-147) | 20 | 34 | 6.0 | 2 |
| | | | 5.9 | 0.5 |
| | | | 5.9 | 1.5 |
| | | | 3.7 | 0 |
| | | | 5.6 | 4.7 |
| | | | 4.6 | 0.0 |
| | | | 3.5 | 0.0 |
| PLA + 10% Wax | 20 | 31 | 5.7 | 6.5 |
| | | | 5.8 | 8 |
| | | | 8.0 | 9 |
| | | | 6.3 | 8 |
| | | | 6.4 | 8.8 |
| | | | 4.6 | 6.0 |
| | | | 3.3 | 1 |
| PLA + 20% Wax | 20 | 29 | 6.3 | 10 |
| | | | 4.8 | 7.3 |
| | | | 3.4 | 1.7 |
| PLA + 1% SLS | 20 | 30 | 6.2 | 6 |
| | | | 5.7 | 6 |
| PLA + 2% SLS | 20 | 30 | 5.9 | 8 |
| | | | 5.5 | 8.7 |
| | | | 4.4 | 3 |
| | | | 3.7 | 0 |

As can be seen in Tables 4-5, the additives did improve OGR performance measured by Kit value for both 35% and 20% emulsions. The data is also plotted in FIGS. 1 and 2 for clear comparison.

For the 35% emulsions, PLA performed well at a coating weight higher than about 7 lb/3000 square feet (SF) and dropped quickly at a lower coating weight. Either SLS or wax increased with the Kit value significantly at a coating weight lower than 7 lb/3000 SF, especially when a higher amount of SLS (2%) or wax (20%) was applied.

For the 20% emulsions, PLA performed poorly at a coating weight lower than 7 lb/3000 SF. Either SLS or wax increased the Kit value significantly and wax performed better than SLS.

In regard to emulsion viscosity, additives did not change it noticeably. All of them were very thin at ambient temperature.

All of the compositions and articles disclosed and claimed herein can be made and executed without undue experimentation in light of the present disclosure. While the compositions and methods of this invention have been described in terms of preferred embodiments, it will be apparent to those of skill in the art that variations may be applied to the compositions and articles described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A composition, comprising:
   from about 5 weight parts to about 50 weight parts of a branched polylactic acid;
   from about 50 weight parts to about 95 weight parts of water; and
   from about 0.1 weight parts to about 1 weight part of a first surfactant;
   wherein the branched polylactic acid comprises from about 3.3 weight parts to about 33 weight parts lactic acid residues; from about 1.3 weight parts to about 13 weight parts polyol residues, wherein the polyol has a molecular weight from about 1000 Da to about 20,000 Da and an OH value from about 10 mg KOH/g to about 100 mg KOH/g; and from about 0.4 weight parts to about 4 weight parts anhydride residues.

2. The composition of claim 1, comprising from about 15 weight parts to about 35 weight parts of the branched polylactic acid; from about 65 weight parts to about 85 weight parts of water; and from about 0.2 weight parts to about 0.6 weight parts of the surfactant.

3. The composition of claim 1, further comprising from about 0.1 weight parts to about 1 weight part of ammonia.

4. The composition of claim 1, wherein the first surfactant is selected from the group consisting of alkyne diol ether surfactants, alkanol ether sulfate surfactants, and mixtures thereof.

5. The composition of claim 1, wherein the branched polylactic acid comprises from about 3.3 weight parts to about 33 weight parts lactic acid residues; from about 1.3 weight parts to about 13 weight parts polyol residues, wherein the polyol has a molecular weight from about 1000 Da to about 20,000 Da and an OH value from about 10 mg KOH/g to about 100 mg KOH/g; and from about 0.4 weight parts to about 4 weight parts anhydride residues, wherein the branched polylactic acid is produced by a process comprising:
   heating the lactic acid, from about 0.0033 weight parts to about 0.033 weight parts of a catalyst selected from the group consisting of stannous alkanoates, tin(II) halides, and mixtures thereof, and from about 0.08 to about 1 weight part of a poly(alkylol)alkane to a temperature from about 170° C. to about 210° C., to yield a first reaction mixture comprising water;

removing water from the first reaction mixture;

lowering the first reaction mixture to a pressure of less than about 50 mm Hg over from about 1 hr to about 10 hr;

maintaining the first reaction mixture at temperature from about 170° C. to about 210° C. and a pressure of less than about 50 mm Hg for a duration from about 2 hr to about 20 hr;

raising the first reaction mixture to about atmospheric pressure;

adding the polyol and from about 0.005 weight parts to about 0.1 weight parts phosphoric acid to the first reaction mixture, to yield a second reaction mixture;

heating the second reaction mixture to a temperature from about 170° C. to about 210° C., to yield a third reaction mixture comprising water;

removing water from the third reaction mixture;

lowering the third reaction mixture to a pressure of less than about 25 mm Hg over from about 0.5 hr to about 5 hr;

maintaining the third reaction mixture at temperature from about 170° C. to about 210° C. and a pressure of less than about 25 mm Hg for a duration from about 1.5 hr to about 12 hr;

raising the third reaction mixture to about atmospheric pressure;

adding the anhydride to the third reaction mixture, to yield a fourth reaction mixture;

heating the fourth reaction mixture to a temperature from about 170° C. to about 210° C., to yield a fifth reaction mixture comprising water;

removing water from the fifth reaction mixture;

lowering the fifth reaction mixture to a pressure of less than about 35 mm Hg over from about 0.5 hr to about 5 hr; and maintaining the third reaction mixture at temperature from about 170° C. to about 210° C. and a pressure of less than about 35 mm Hg for a duration from about 1 hr to about 10 hr.

6. The composition of claim 1, wherein the composition has a viscosity, as measured on a Brookfield viscometer with a #3 spindle at 100 rpm and 140° F., from about 0.1 cps to about 20 cps.

7. The composition of claim 1, wherein the composition further comprises at least one material selected from the group consisting of a press starch, a pigment, and mixtures thereof.

8. The composition of claim 1, further comprising an additive selected from the group consisting of from about 5 weight parts to about 40 weight parts wax, from about 0.5 weight parts to about 5 weight parts of a second surfactant, and mixtures thereof.

9. A paper product, comprising:

a substrate containing paper or paperboard and having a first surface and a second surface, and a coating applied at least to part of the first surface of the substrate, wherein the coating contains from about 5 weight parts to about 50 weight parts of a branched polylactic acid and from about 0.1 weight parts to about 1 weight part of a first surfactant, wherein the branched polylactic acid comprises from about 3.3 weight parts to about 33 weight parts lactic acid residues; from about 1.3 weight parts to about 13 weight parts polyol residues, wherein the polyol has a molecular weight from about 1000 Da to about 20,000 Da and an OH value from about 10 mg KOH/g to about 100 mg KOH/g; and from about 0.4 weight parts to about 4 weight parts anhydride residues.

10. The paper product of claim 9, wherein the coating comprises from about 15 weight parts to about 35 weight parts of the branched polylactic acid and from about 0.2 weight parts to about 0.6 weight parts of the surfactant.

11. The paper product of claim 9, wherein the first surfactant is selected from the group consisting of nonionic surfactants, sodium alkyl ether sulfate surfactants, and mixtures thereof.

12. The paper product of claim 9, wherein the coaching further comprises an additive selected from the group consisting of from about 5 weight parts to about 40 weight parts wax, from about 0.5 weight parts to about 5 weight parts of a second surfactant, and mixtures thereof.

13. The paper product of claim 9, wherein the paper product contains from about 0.1 lb to about 15 lb polylactic acid per 25 lb of the substrate.

14. The paper product of claim 13, wherein the paper product contains from about 0.75 lb to about 8 lb polylactic acid per 25 lb of the substrate.

15. The paper product of claim 9, wherein the substrate is paperboard.

16. The paper product of claim 9, wherein the paper product is in the form of a package that contains an oily or greasy food and the coating stands between the oily or greasy food and the substrate.

17. The paper product of claim 16, wherein the oily or greasy food is selected from the group consisting of pet food, microwaveable popcorn, pizza, fried potatoes, fried vegetables, pastries, chocolate bars, and foods containing an oil-based sauce.

18. The paper product of claim 9, wherein the paper product has a parameter selected from the group consisting of an HST sizing value at least ten times greater than the HST sizing value of the substrate alone, a 3M Test Kit value greater than or equal to 4, and both.

19. The paper product of claim 9, produced by a process comprising:

applying, with an apparatus selected from the group consisting of a puddle size press, a flooded nip size press, a rod coater, and a blade coater, and at a temperature from about 50° F. to about 180° F., a composition comprising from about 5 weight parts to about 50 weight parts of a branched polylactic acid, from about 50 weight parts to about 95 weight parts of water, and from about 0.1 weight parts to about 1 weight part of a first surfactant to the substrate.

20. The paper product of claim 19, wherein the apparatus is a puddle size press or a flooded nip size press.

21. The paper product of claim 19, wherein the composition further comprises at least one material selected from the group consisting of press starches, pigments, and mixtures thereof.

* * * * *